July 5, 1955
J. A. RITTER
2,712,218
GAS TURBINE APPARATUS
Filed Nov. 29, 1951
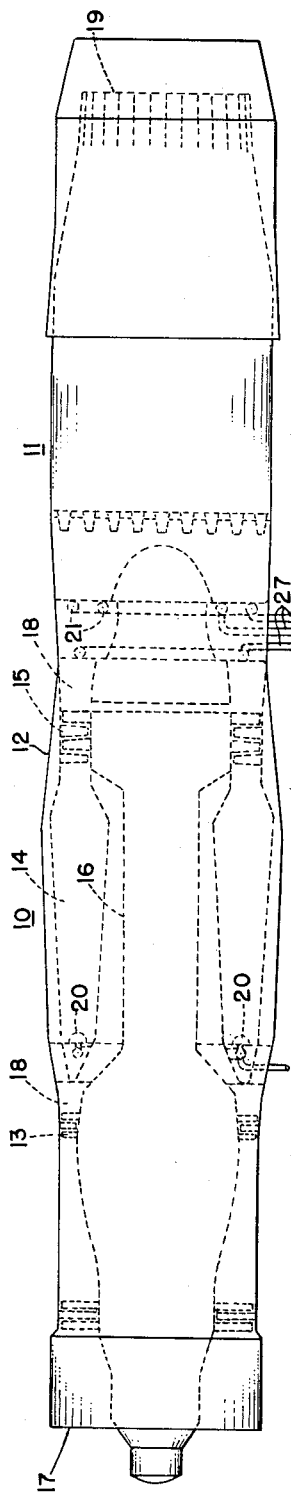
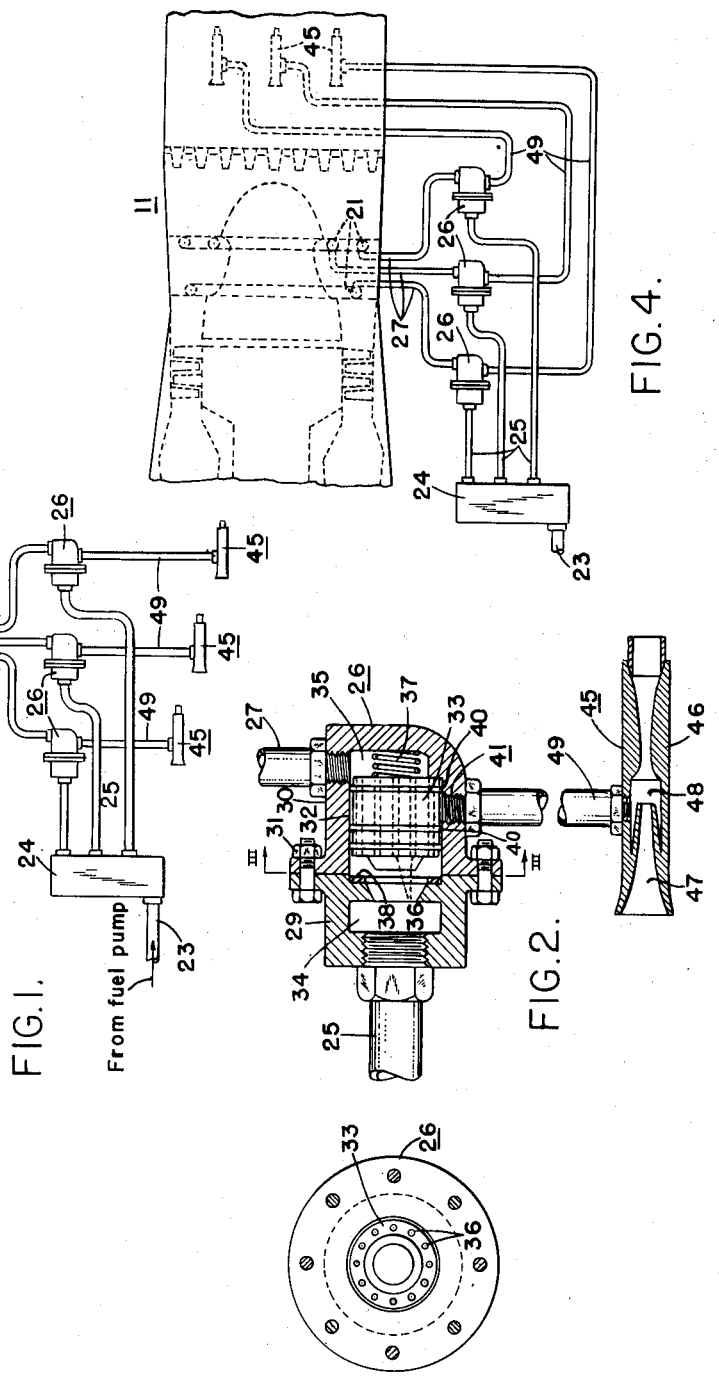
INVENTOR
JOHN A. RITTER
BY
Ralph T. French
ATTORNEY

United States Patent Office 2,712,218
Patented July 5, 1955

2,712,218
GAS TURBINE APPARATUS

John A. Ritter, Norwood, Pa., assignor to Westinghouse Electric Corporation, East Pittsburgh, Pa., a corporation of Pennsylvania Application November 29, 1951, Serial No. 258,917

4 Claims. (Cl. 60—39.09)

This invention relates to fluid fuel control apparatus for continuous combustion power plants such as gas turbine engines, and particularly to fuel scavenging means for the afterburner of an aviation power plant.

In order to reduce "coking" in the nozzles and fuel ring or manifold of an afterburner, due to the tendency of residual fuel therein to deposit carbon after the afterburner fuel pump is rendered inoperative, it is desirable to provide scavenge means for removing fuel from the fuel ring as quickly as possible after shutting off of the afterburner, and preferably within an interval of about one quarter of a second or less. It is one object of this invention to provide fuel scavenging means automatically operative to effect removal of such unburned fuel from an afterburner before it has been sufficiently heated to cause "coking" in the fuel ring or nozzles.

Another object of the invention is the provision of improved fuel scavenging means having the foregoing desired operational characteristics and adapted to be readily installed in a power plant, such as an aviation turbojet, without necessitating detailed changes in design or adding appreciable weight to the engine.

A further object of the invention is to provide improved scavenging means for a fuel manifold including an automatic dump valve cooperative with an ejector for efficiently removing residual fuel over a long service period without entailing frequent attention for maintenance.

These and other objects are effected by the invention as will be apparent from the following description and claims taken in connection with the accompanying drawing, forming a part of this application, in which:

Fig. 1 is a schematic longitudinal view of an aviation gas turbine power plant having associated therewith a portion of a fuel system including fuel scavenging apparatus constructed in accordance with the invention;

Fig. 2 is an enlarged detail, sectional view of one of the scavenging devices shown in Fig. 1;

Fig. 3 is a sectional view taken along the line III—III of Fig. 2; and

Fig. 4 is a fragmentary view of apparatus similar to that shown in Fig. 1 but embodying details of the invention in modified form.

Shown in Fig. 1 is a typical gas turbine engine 10, which is equipped with an afterburner 11, and is adapted to be mounted in or on the fuselage or wing of an aircraft (not shown). The engine comprises generally cylindrical casing structure 12 having mounted in alignment along the axis therein a compressor 13, annular combustion apparatus 14, and a turbine 15, the usual rotor of which is operatively connected to that of the compressor 13 through the medium of a shaft 16. Extending through the power plant from a forwardly disposed air intake opening 17 is an annular passageway, generally indicated by the reference character 18, which terminates in a jet nozzle 19 which is formed in the outer end of the afterburner 11. In operation, air entering the intake opening 17 is compressed by the compressor and delivered to the combustion apparatus 14, where fuel supplied by way of nozzles 20 is burned to provide motive gases for driving the turbine 15. Suitably supported in the afterburner 11 downstream of the turbine 15 are a plurality of fuel rings or manifolds 21 having orifices through which fuel may be introduced into the stream of turbine exhaust gases for augmenting the propulsive thrust created upon final discharge of the gases through the nozzle 19.

For supplying fuel to the afterburner 11, there is provided a suitable fuel system including a source of metered fuel (not shown) communicating with a fuel supply pipe 23, and a fuel distributor device 24, which serves to distribute the afterburner fuel through a number of pipes 25, dump valve devices 26 and pipes 27 to the fuel manifolds 21 in the afterburner 11. The distributor 24 is not shown in detail, but may be constructed and operated in accordance with the disclosure of a similar device in Patent No. 2,508,420, issued to A. H. Redding and assigned to the assignee of the present invention.

According to the invention, as best shown in Fig. 2, each of the dump valve devices 26 comprises casing sections 29 and 30 which are secured together by a plurality of bolts 31. Formed in this casing structure is a bore 32 containing a dump valve element 33 which is interposed between an inlet chamber 34 communicating with the adjacent pipe 25, and an outlet chamber 35 communicating with the corresponding pipe 27. A plurality of axially disposed passages 36 are formed in the dump valve element 33. A spring 37 is interposed between the end wall of outlet chamber 34 and the dump valve element 33 for urging the latter toward engagement with an annular seat 38 to close the passages 36. With the dump valve element in the fuel supplying position illustrated in Fig. 2, a pair of lands 40 carried on the valve are disposed in closing relation with a dump port 41, which is formed in the casing section 26. Communication between the dump port 41 and the outlet chamber 35 is established, however, upon movement of the dump valve element 33 to the seat 38 by spring 37, when the supply of afterburner fuel under pressure to the pipe 25 is cut off.

For facilitating rapid discharge of residual fuel from the after burner fuel manifolds by way of the dump valve devices 26, a Venturi device or fluid ejector 45 is associated with each of the dump valve devices. As shown in Fig. 2, each ejector 45 comprises a tubular body 46 having a motive fluid passage 47 including a Venturi or throat portion 48 which communicates by way of a pipe 49 with the dump port 41 of the associated dump valve device 26.

In the form of the apparatus shown in Fig. 1, the ejectors 45 are adapted to be mounted outwardly of the engine envelope and in the atmospheric slip stream passing the aircraft in which the engine 10 is carried. So long as the supply of fuel under normal pressure by way of pipe 25 is continued, the pressure of fuel entering the inlet chamber 34 of each dump valve device 26 will be sufficient to overcome the force of spring 37 and to maintain the valve element 33 in the normal position illustrated in Fig. 2, for effecting flow of the fuel to the associated fuel manifold 21 by way of the valve passages 36, outlet chamber 35 and pipe 27. At the same time, the valve element 33 will be positioned to lap the dump port 41. When the after-burner is to be rendered inoperative and the supply of fuel to the pipe 25 is cut off, however, the resultant reduction in fuel pressure in the inlet chamber 34 of each dump valve device permits the spring 37 to shift the valve element 33 into engagement with the seat 38, thus closing the passages 36 and establishing communication between the afterburner fuel manifold 21 and the dump port 41 by way of the pipe 27 and outlet chamber 35. With the associated ejector device 45, motivated by the outside slip stream, thus connected to the manifold, all residual fuel is thereby quickly ejected therefrom in time to prevent undesired coking or deposition of carbon on any surfaces exposed to the heat in the afterburner.

Referring to Fig. 4, the ejector devices 45 may, if preferred, be mounted in the afterburner 11 and thus adapted to be motivated by the turbine exhaust gases. Operation of the apparatus shown in Fig. 4 will, of course, be readily understood from the foregoing description of the equipment shown in Fig. 1.

While the invention has been shown in several forms, it will be obvious to those skilled in the art that it is not so limited, but is susceptible of various other changes and modifications without departing from the spirit thereof.

What is claimed is:

1. Fuel scavenging apparatus comprising a valve casing having a valve chamber communicating with a fuel inlet, a fuel outlet and a fuel dump port, a valve element operatively mounted in said valve chamber and having a face subject to pressure of fuel in said inlet for holding said valve element in closing relation with said dump port, said valve element having passages for normally effecting flow of fuel under pressure from said inlet to said outlet, a valve seat carried in said casing, a spring interposed between the casing and said valve element for urging the latter toward engagement with said valve seat to close said passages while establishing communication between said fuel outlet and said fuel dump port, and Venturi ejector means connected to said dump port for facilitating quick withdrawal of fuel from said fuel outlet and valve chamber upon engagement of said valve element with said valve seat.

2. In fuel ejection apparatus for removing unburned fuel from the afterburner fuel manifold of an aviation jet power plant, the combination of a casing forming a valve chamber, and having in communication therewith a fuel inlet and a fuel outlet, a fuel dump port formed in said casing, ejector means connected to said fuel dump port, a valve seat disposed in said valve chamber adjacent the fuel inlet, a spring, and a valve element subject to the opposing pressures of said spring and of fuel in said inlet, said valve element being normally operable by the pressure of fuel in said inlet to maintain fuel flow communication therefrom to said fuel outlet while closing said fuel dump port, said valve element being operable by said spring upon a reduction in fuel pressure to cut off communication between said fuel inlet and said fuel outlet while connecting the latter to said dump port.

3. Fuel scavenging apparatus for removing unburned fuel from the combustion zone of an aircraft power plant carried adjacent the aircraft slip stream, comprising the combination of a fuel system for supplying fuel to the combustion zone, a dump valve device interposed in said fuel system and having a discharge communication, said device being operative to divert unburned fuel from said combustion zone to said discharge communication upon cessation of fuel flow through said fuel system, and ejector means mounted in the air-craft slip stream and connected to said discharge communication for facilitating the withdrawal of fuel from said combustion zone by way of said dump valve device.

4. Fuel scavenging apparatus for the fuel system of an aviation power power plant having a fuel discharge manifold and associated combustion apparatus adapted for flow therethrough of a high velocity gas stream, said scavenging apparatus comprising a dump valve device including a spring-pressed valve element subject to fuel supply pressure and normally maintained in an open position for effecting supply of fuel to said fuel discharge manifold, said dump valve device having a normally closed dump port adapted to be connected to said fuel discharge manifold upon movement of said valve element away from its open position in response to a reduction in fuel pressure, and ejector means mounted within the gas stream in said combustion apparatus and connected to said dump port, said ejector means being motivated by the gas stream for facilitating ejection of unburned fuel from said fuel discharge manifold.

No references cited.